Patented Apr. 20, 1937

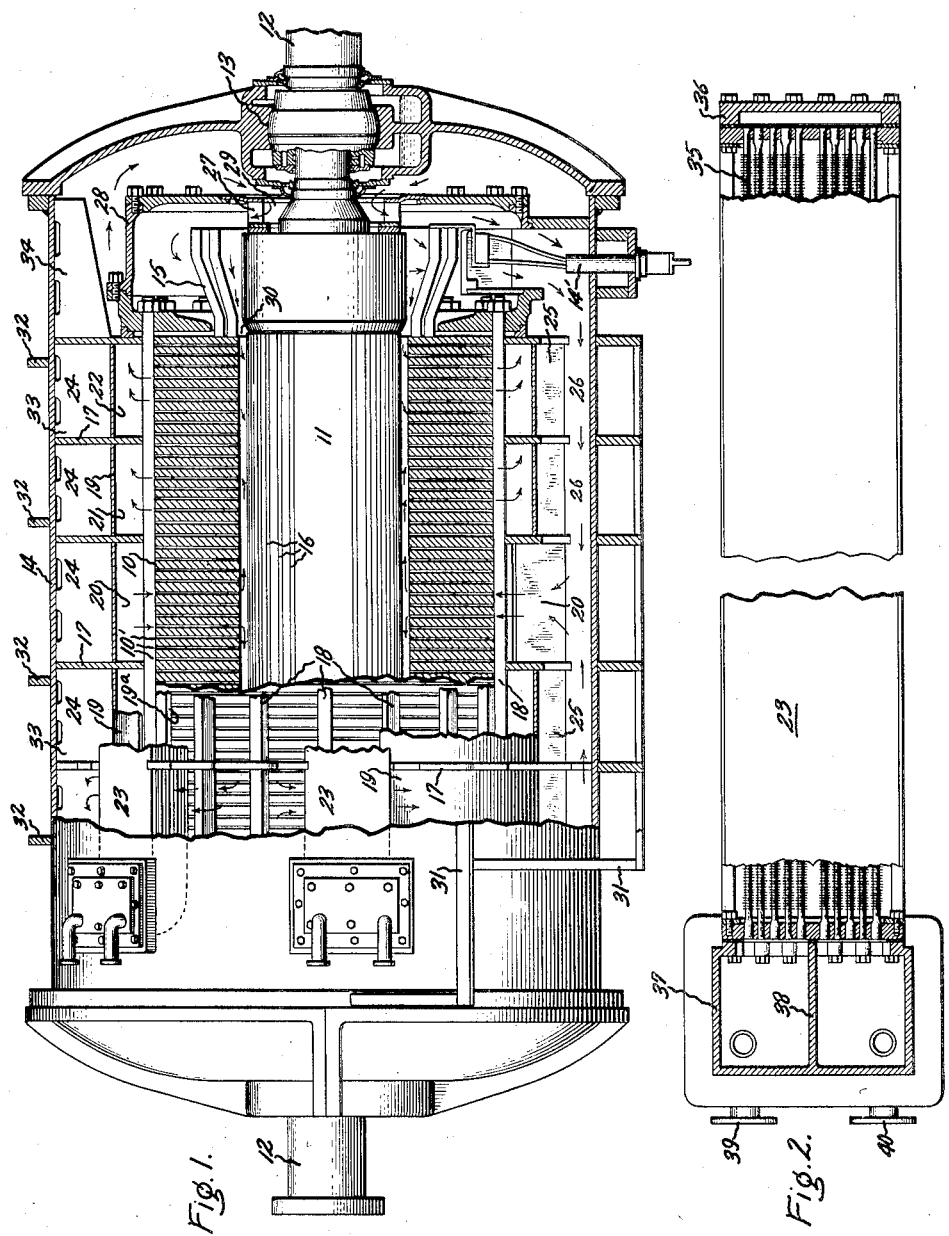

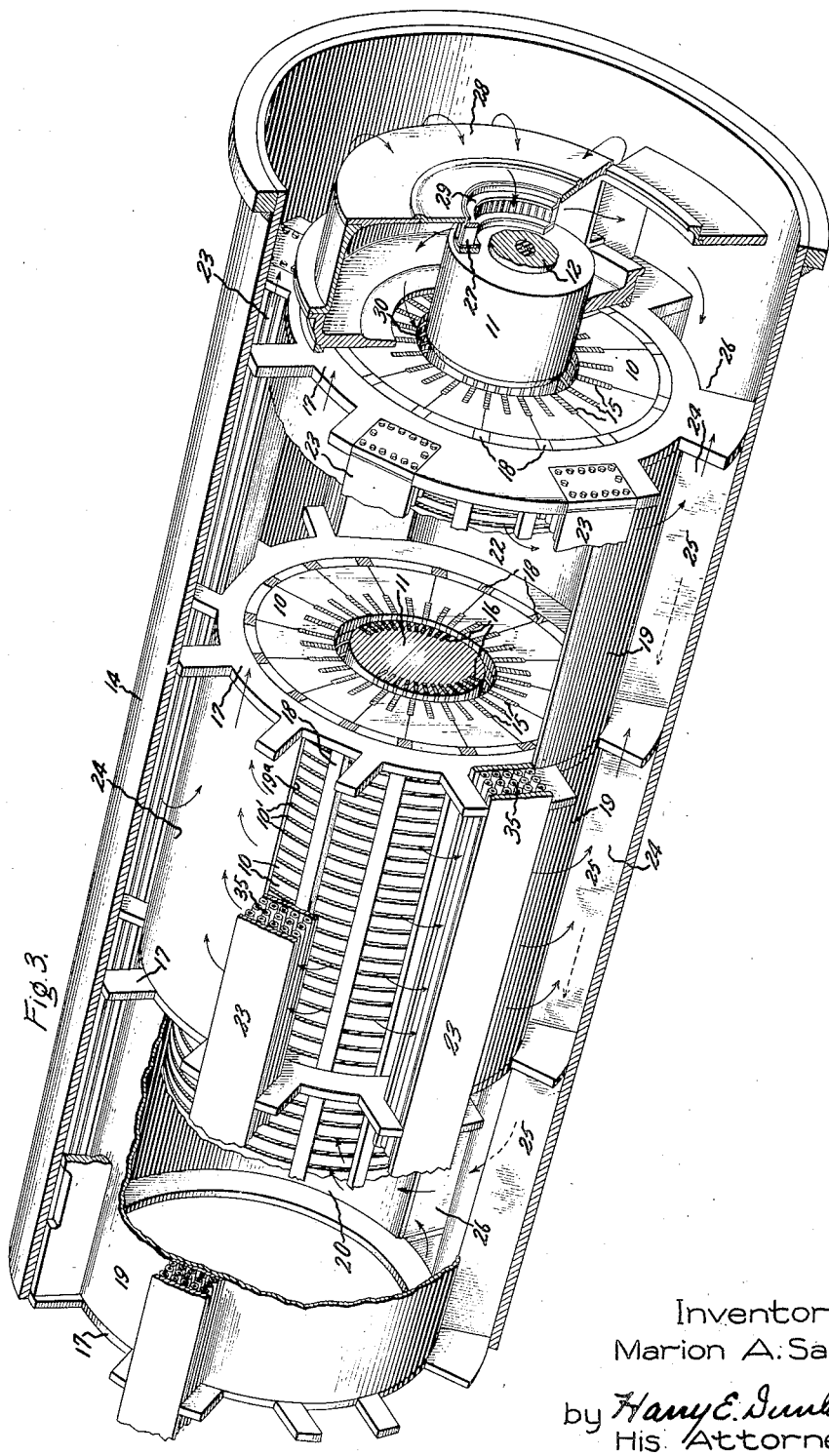

2,078,164

UNITED STATES PATENT OFFICE 2,078,164

TOTALLY ENCLOSED DYNAMO-ELECTRIC MACHINE

Marion A. Savage, Scotia, N. Y., assignor to General Electric Company, a corporation of New York Application June 24, 1936, Serial No. 86,963

11 Claims. (Cl. 171—252)

My invention relates to totally enclosed dynamo-electric machines and more particularly to an arrangement of surface coolers in such machines.

It is an object of my invention to provide an arrangement of surface coolers for such a machine which will decrease its length between bearing centers and thus increase its critical speed to a more desirable value relative to its operating speed.

It is a further object of my invention to provide an arrangement of surface coolers which will permit a more uniform and better distribution of the cooling gas, thus making it possible to construct a machine having an enclosing housing of smaller size than is possible when using other arrangements of surface coolers heretofore proposed.

It is another object of my invention to provide an arrangement of surface coolers which is particularly suited for multi-flow systems in which the cooling gas is circulated in two or more circuits through the structure of the dynamo-electric machine.

It is also an object of my invention to provide a cooling system which may be enclosed in a cylindrical boiler-like housing which also encloses the stationary and rotatable members of the dynamo-electric machine, thus making it possible to use high pressure cooling gases such as hydrogen at several atmospheres' pressure without using a housing of massive construction.

In arrangements embodying my invention the surface coolers are axially disposed between the stationary member of the dynamo-electric machine and a housing enclosing the same, and cooling gas is circulated through the machine and through these coolers by means of a duct system having axially disposed passageways extending between the stationary member of the dynamo-electric machine and the housing enclosing the same.

For a better understanding of my invention, reference may be had to the following description taken in connection with the accompanying drawings, in which Fig. 1 is a side view, partly in section, of a dynamo-electric machine embodying my invention; Fig. 2 is a plan view, partly in section illustrating the construction of the surface coolers employed in the machine illustrated in Fig. 1; and Fig. 3 is a perspective view of slightly more than the right half of the machine of Fig. 1 with parts broken away to show the arrangement of coolers and the duct system associated therewith by means of which cooling gas is circulated in the dynamo-electric machine illustrated in Fig. 1, Fig. 3 being exaggerated in length for the sake of clearness.

In Figs. 1 and 3 of the drawings, 10 is the stationary member of a dynamo-electric machine, which surrounds a rotatable member 11 having a shaft 12 which is journaled in bearings 13 in a housing 14 entirely enclosing the machine. The dynamo-electric machine may be the generator of a turbo-generator set, the turbine shaft being bolted to the flanged left end of the shaft 12. The stationary member 10 and the rotatable member 11 are provided with windings 15 and 16 arranged in slots in these members and constituting the armature and field windings respectively of the dynamo-electric machine illustrated. The connections to the field winding extend through the right end of the shaft 12 to slip rings, not shown, located on the end of the shaft extending from the housing 14, and the connections to the armature winding extend through bushings 14' in the housing 14. A direct connected, or gear connected, exciter may be attached to the right end of the shaft 12.

The stationary member 10 of the dynamo-electric machine comprises a laminated core structure provided with radial cooling spaces 10' extending therethrough. This core structure is supported in the housing 14 by a plurality of annular plates 17 surrounding the laminations and supporting them through the agency of ribs 18 to which the laminations are attached. A shell 19 of plates extending between and attached to the annular plates 17 form annular chambers 20, 21 and 22 enclosing the outer peripheries of the radial cooling spaces in the central, intermediate and end sections of the core structure of the stationary member of the dynamo-electric machine. These chambers communicate with the space between the shell 19 and the housing 14 through openings 19a in the shell.

In the arrangement illustrated, the intermediate chamber 21 and end chambers 22 are each provided with two openings which are axially aligned with one another and extend between the annular plates 17 forming the side walls of these chambers. The openings in each of the chambers 21 and 22 are circumferentially spaced from one another and are located slightly above the horizontal center line of the machine. Axially disposed coolers 23 are located between the shell 19 and housing 14 on opposite sides in these openings in the intermediate chamber 21 and end chambers 22. The peripheries of the annular plates 17 are notched to provide supports for the coolers 23, and cut away to form exhaust passageways 24 between the shell 19 and the housing 14 on the sides of the coolers remote from the openings in the intermediate and end chambers 21 and 22. The coolers 23 are thus located between the passageways 24 and the openings 19a in the shell 19 communicating with these chambers. Plates 25 extending between the shell 19 and the housing 14 at the bottom of the machine form supply passageways or ducts 26 extending from the ends of the machine to the central chamber 20 communicating therewith through an opening in the shell 19 located at the bottom of the machine.

At each end of the machine there is a fan 27 supported on the rotatable member 11 and enclosed by a fan casing 28 which also encloses the end turns of the winding 15. This casing is spaced from the housing 14 to provide communication between the passageways 24 and the intake opening 29 for the fan 27. This casing is also spaced from the rotatable member 11 to form an exhaust passageway 30 opposite the gap between the stationary and rotatable members at the end of the machine. The ducts 26 above referred to extend from exhaust openings in the fan casings 28 to the central chamber 20, as above described.

The dynamo-electric machine is supported on a base formed by a framework 31 attached to the outside lower portion of the housing 14. Part of this framework extends about the housing forming strengthening ribs 32, as shown in the drawings. An axially extending rib 33 is located at the top of the machine between the shell 19 and housing 14 and cooperates with the plates 25 located at the bottom of the machine to stiffen the supporting structure within the housing for the stationary member of the machine. Longitudinally extending members 34 distributed about the end portions of the housing 14 also serve to strengthen the housing at its ends which support the rotor of the machine through the agency of bearings 13 located in the ends of the housing. The ends of the housing are bolted to its cylindrical portion to render them readily removable. For the most part the supporting frame of the machine is fabricated by welding its constituent parts into a unitary structure.

The direction of flow of the cooling gas through the machine is illustrated by arrows in Figs. 1 and 3. It will be noted that fans 27 supply cooling gas to the outer peripheries of the radial cooling spaces in the central portion of the core structure which is enclosed by the chamber 20. This gas flows toward the rotatable member through these radial cooling spaces and passes by way of the gap between the stationary and rotatable members to the inner peripheries of the adjacently located radial cooling spaces in the intermediate sections of the core structure. Cooling gas is also supplied by way of the gap between the rotatable and stationary members to the inner peripheries of the radial cooling spaces in the end sections of the machine enclosed by the chambers 22. The gas supplied to the inner peripheries of the radial cooling spaces in the end and intermediate sections of the core structure of the stationary member of the machine exhaust through the outer peripheries and these radial cooling spaces into chambers 21 and 22 from which it flows through coolers 23 located at opposite sides of the openings 19a in these chambers to exhaust passageways 24 and thence to the ends of the machine about the fan casings 28 to the intake openings 29 in these housings to the fans 27.

The machine illustrated in Figs. 1 and 3 is provided with four coolers 23 which are of the surface type and comprise, as shown in Fig. 2, a plurality of finned tubes 35 extending between headers 36 and 37. The header 37 is partitioned at 38 and divided into two compartments which are connected through pipes 39 and 40 to the intake and exhaust of a fluid supply system, such as water, by means of which cooling fluid is circulated through the finned tubes 35.

The end of the housing 14, which encloses the machine, is divided along a horizontal plane and can be removed and separated to permit lengthwise removal of the coolers 23 after they have been detached from their headers 37 which are attached to the cylindrical portion of the housing 14, adjacent the driving connection for the rotatable member of the machine.

The closed system above described is particularly suited for using hydrogen or a similar gas as the cooling medium. In order to cool a dynamo-electric machine with a gas such as hydrogen, it is very desirable to provide a gas tight housing about the machine to prevent the escape of gas and also to prevent contamination of the gas within the housing by the surrounding air. Liquid seals are generally employed where the shaft of the machine extends through the ends of the housing to provide a gas-tight enclosure. An auxiliary apparatus is also usually provided for removing the cooling gas from the sealing liquid and for returning it to the housing. A suitable seal and apparatus associated therewith for separating the cooling gas from the liquid of the seal is disclosed and claimed in Patent 1,559,182, Chester W. Rice, granted on October 27, 1925 to the assignee of the present application.

When a gas such as hydrogen is used as the cooling gas the efficiency and output of the machine is greatly increased if the gas is used at high pressure. The improved efficiency and output results from the improved cooling qualities of hydrogen at high pressures. The windage loss in an atmosphere of hydrogen at several atmospheres' pressure is about the same as the windage loss in air at atmospheric pressure. The cooling system embodying my invention may be enclosed together with the stationary and rotatable members of the dynamo-electric machine in a cylindrical boiler-like housing which can be made of comparatively light weight material and still withstand the pressure of the cooling gas.

Although I have illustrated and described a particular construction in which the cooling gas is circulated through axially disposed coolers in particular directions in a multi-circuit system, it is to be understood that my invention is not limited to the particular arrangement illustrated and described, and I do not desire to be limited thereto, but intend in the appended claims to cover all modifications which do not depart from the spirit and scope of my invention.

What I claim as new and desire to secure by Letters Patent of the United States is:

1. A dynamo-electric machine comprising a rotatable member, a stationary member surrounding said rotatable member and having radial cooling spaces therein, a housing spaced from and enclosing said stationary member, a shell spaced from said housing and forming about said stationary member a chamber having an opening therein communicating with the space between said shell and said housing, an axially disposed passageway between said shell and said housing and an axially disposed cooler between said shell and said housing and between said opening in said shell and said passageway.

2. A dynamo-electric machine comprising a rotatable member, a stationary member surrounding said rotatable member and having radial cooling spaces therein, a cylindrical boiler-like housing spaced from and enclosing said stationary member, a shell spaced from said housing and forming about said stationary member a chamber having an opening therein communicating with the space between said shell and said housing, an axially disposed passageway between said shell and said housing and an axially disposed cooler between said shell and said housing and between said opening in said shell and said passageway.

3. A dynamo-electric machine comprising a rotatable member, a stationary member surrounding said rotatable member and having radial cooling spaces therein, a housing spaced from and enclosing said stationary member, a shell spaced from said housing and forming about said stationary member a chamber having an opening therein communicating with the space between said shell and said housing, a plurality of axially disposed passageways between said shell and said housing on opposite sides of said opening in said shell, and a plurality of axially disposed coolers between said shell and said housing on opposite sides of said opening in said shell and between said opening and said passageways.

4. A dynamo-electric machine comprising a rotatable member, a stationary member surrounding said rotatable member and having radial cooling spaces therein, a housing spaced from and enclosing said stationary member, a shell spaced from said housing and forming about said stationary member a plurality of axially disposed chambers which communicate with the space between said shell and said housing through openings in said shell, a duct system having axially disposed passageways between said shell and said housing which communicates with said chambers through said openings in said shell, an axially disposed cooler between said shell and said housing and between one of said passageways and at least one of said openings in said shell, and means for circulating a cooling medium through said radial cooling spaces by way of said passageways and said cooler.

5. A dynamo-electric machine comprising a rotatable member, a stationary member surrounding said rotatable member and having radial cooling spaces therein, a housing spaced from and enclosing said stationary member, a shell spaced from said housing and forming about said stationary member a plurality of axially disposed chambers communicating with the space between said shell and said housing through openings in said shell, a fan mounted on said rotatable member, a duct system communicating with the exhaust and intake of said fan and having axially disposed passageways between said shell and said housing which communicate with the openings in said shell for supplying cooling gas to said radial cooling spaces, and an axially disposed cooler between said shell and said housing and between one of said passageways and at least one of said openings in said shell.

6. A dynamo-electric machine comprising a rotatable member, a stationary member surrounding said rotatable member and having radial cooling spaces therein, a housing spaced from and enclosing said stationary member, a shell spaced from said housing and from said stationary member and having openings therein communicating with the space between said shell and said housing, means including an axially disposed passageway between said shell and said housing for supplying cooling gas through one of said openings in said shell to the outer peripheries of a group of said radial cooling spaces, means including another axially disposed passageway between said shell and said housing for exhausting cooling gas through another of said openings in said shell from the outer peripheries of another group of said radial cooling spaces adjacent said first-mentioned group of radial cooling spaces, an axially disposed cooler between said casing and said housing and between one of said openings in said shell and one of said passageways, and means for circulating cooling gas through said radial cooling spaces said passageways and said cooler.

7. A dynamo-electric machine comprising a rotatable member, a stationary member surrounding said rotatable member and having radial cooling spaces therein, a housing spaced from and enclosing said stationary member, a shell spaced from said housing and forming about said stationary member a plurality of chambers closed off from one another and enclosing groups of said radial cooling spaces, said shell having openings therein between said chambers and the space between said shell and said housing, axially disposed coolers between said shell and said housing and located on opposite sides of an opening in said shell to one of said chambers, axially disposed passageways between said shell and said housing communicating with said opening to said one chamber through said axially disposed coolers, a passageway between said casing and said housing closed off from said above-mentioned passageways and communicating through another opening in said shell with another of said chambers, and means for circulating a cooling gas through said radial cooling spaces from said one chamber to said other chamber by way of said passageways said cooler and the gap between said stationary and said rotatable members.

8. A dynamo-electric machine comprising a rotatable member, a stationary member surrounding said rotatable member and having radial cooling spaces therein, a housing spaced from and enclosing said stationary member, means including an axially disposed passageway between said stationary member and said housing for supplying cooling gas to the outer peripheries of a group of said radial cooling spaces, means including another axially disposed passageway between said stationary member and said housing for exhausting cooling gas from the outer peripheries of another group of said radial cooling spaces located adjacent said first-mentioned group of radial cooling spaces, an axially disposed cooler between said stationary member and said housing and in the path of flow of cooling gas from the outer peripheries of one of said groups of radial cooling spaces to one of said passageways, and means for circulating a cooling gas through said radial cooling spaces and through said passageways and said cooler, said cooling gas passing from the outer peripheries of said first-mentioned group of radial cooling spaces along the gap between said stationary and said rotatable members to the inner peripheries of said other group of adjacently located cooling spaces.

9. A dynamo-electric machine comprising a rotatable member, a stationary member surrounding said rotatable member and having radial cooling spaces therein, a housing spaced from and enclosing said stationary member, means including an axially disposed passageway between said stationary member and said housing for supplying cooling gas to the outer peripheries of a group of said radial cooling spaces, means including another axially disposed passageway between said stationary member and said housing for exhausting cooling gas from the outer peripheries of a second group of said radial cooling spaces located adjacent said first-mentioned group of radial cooling spaces, an axially disposed cooler between said stationary member and said housing and in the path of flow of cooling gas from the outer peripheries of said other group of radial cooling spaces to said exhaust passageway, and means for circulating cooling gas through said radial cooling spaces, said passageways and said cooler, said cooling gas passing through said supply passageway to the outer peripheries of said first-mentioned group of radial cooling spaces through to the gap between said stationary and said rotatable members to the inner peripheries of said other group of radial cooling spaces from which it exhausts through said cooler into said exhaust passageway.

10. A dynamo-electric machine comprising a rotatable member, a stationary member surrounding said rotatable member and having radial cooling spaces, a housing spaced from and enclosing said stationary member, a shell forming a chamber about the outer peripheries of an inner group of said radial cooling spaces, a shell spaced from said housing and forming a chamber about the outer peripheries of an end group of said radial cooling spaces, a shell spaced from said housing and forming a chamber about the outer peripheries of an intermediate group of said cooling spaces, said shells surrounding said intermediate and said end groups of radial cooling spaces having aligned axially disposed openings therein communicating with the space between said shells and said housing, axially disposed coolers between shells and said housing on opposite sides of said aligned axially disposed openings, axially disposed passageways between said shells and said housing communicating with said aligned axially disposed openings through said coolers, a fan mounted on said rotatable member, a duct system connecting the intake of said fan with said axially disposed passageways and connecting the exhaust of said fan with said inner shell and with the gap between said stationary member and said rotatable member at the end of said stationary member.

11. A dynamo-electric machine comprising a rotatable member, a stationary member surrounding said rotatable member and having radial cooling spaces, a housing spaced from and enclosing said stationary member, a shell forming a chamber about the outer peripheries of an inner group of said radial cooling spaces, a shell spaced from said housing and forming a chamber about the outer peripheries of an end group of said radial cooling spaces, a shell spaced from said housing and forming a chamber about the outer peripheries of an intermediate group of said cooling spaces, said shells surrounding said intermediate and said end group of radial cooling spaces having aligned axially disposed openings therein communicating with the space between said shells and said housing, axially disposed coolers between said shells and said housing on opposite sides of said aligned axially disposed openings, axially disposed passageways between said shells and said housing communicating with said aligned axially disposed openings through said coolers, a fan mounted on the end of said rotatable member, a casing about said fan, said casing having an intake opening and being spaced from said housing to provide communication between said intake opening and said passageways and said casing having an exhaust opening communicating with the gap between said rotatable member and said stationary member at the end of said stationary member, and a duct located between said shells and said housing and connecting said central shell with an exhaust opening in said fan casing.

MARION A. SAVAGE.